United States Patent [19]

Elsing

[11] Patent Number: 5,295,028
[45] Date of Patent: Mar. 15, 1994

[54] SPINDLE ASSEMBLY WITH LABYRINTH SEALS AND HUB/BACK IRON SPACERS

[75] Inventor: John W. Elsing, Edina, Minn.

[73] Assignee: Seagate Technology, Inc., Scotts Valley, Calif.

[21] Appl. No.: 112,861

[22] Filed: Aug. 25, 1993

Related U.S. Application Data

[60] Continuation of Ser. No. 936,478, Aug. 28, 1992, abandoned, which is a division of Ser. No. 560,747, Jul. 31, 1990.

[51] Int. Cl.$^5$ .............................................. G11B 17/02
[52] U.S. Cl. .............................. 360/97.01; 360/97.02; 360/98.07; 360/99.08
[58] Field of Search .......................... 360/97.01–99.12

[56] References Cited

U.S. PATENT DOCUMENTS

| | | | |
|---|---|---|---|
| 4,672,487 | 6/1987 | Brand et al. | 360/97.03 |
| 4,835,637 | 5/1989 | Mach et al. | 360/98.02 |
| 5,001,581 | 3/1991 | Elsasser et al. | 360/97.02 |
| 5,091,809 | 2/1992 | Connors et al. | 360/97.02 |

Primary Examiner—Robert S. Tupper

[57] ABSTRACT

A disk drive assembly includes a disk pack with an axially retractable spindle assembly and a rotary actuator, mounted within a unitary deck and precision aligned by bores through spaced apart upper and lower support walls of the deck. Bushing sleeves, mounted through bearings to opposite ends of a spindle shaft, are aligned and secured within the bores by screws through the support walls and threaded into the bushing sleeves, thus to secure the spindle shaft for rotation relative to the support walls. A cup-shaped hub is fixed to the spindle shaft. A radially outward wall of the hub has upwardly converging flutes that cooperate with openings through annular spacers between adjacent disks on the hub, to provide a purging and cooling air flow. The hub and bushing sleeves have interacting pairs of annular flanges and annular grooves, and the bushing sleeves include extensions adjacent the bearings, to control radially outward passage of air from the center of the spindle assembly toward the region of the disks. Three angularly spaced apart fasteners extend through the hub and into an annular back iron through an annular edge of the back iron, to secure the back iron to the hub. An outer circumferential surface of the back iron and the radially outward wall of the hub are radially spaced apart from one another when the hub and back iron are secured. Three spacers between the back iron edge and hub, one surrounding each fastener, maintain the hub and back iron in axially spaced apart relation.

14 Claims, 5 Drawing Sheets

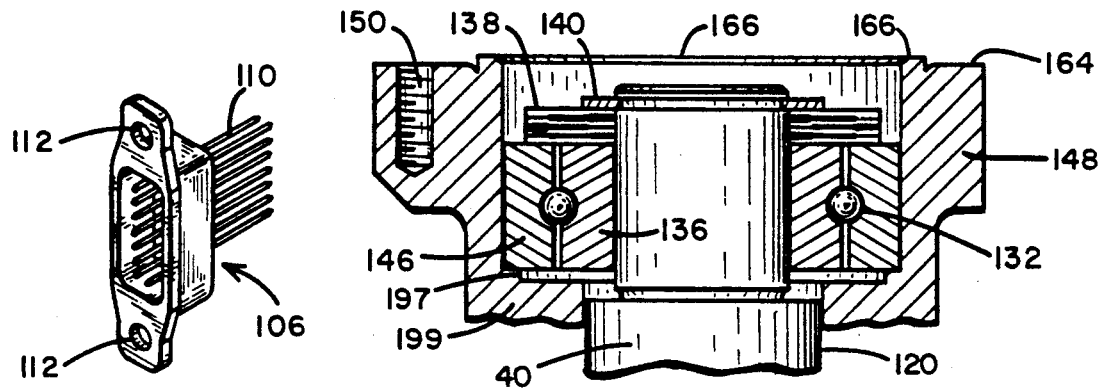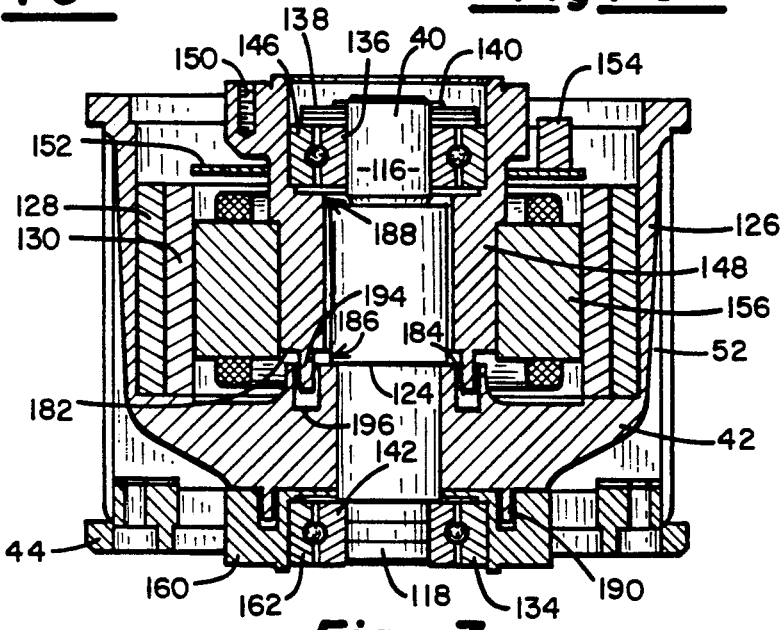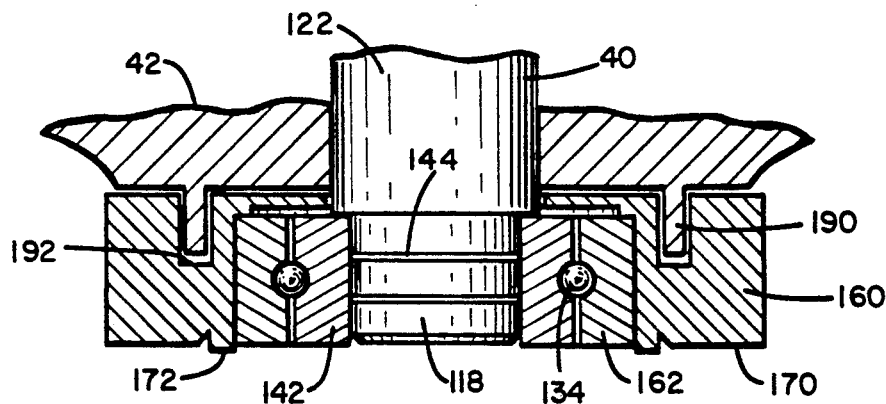

SPINDLE ASSEMBLY WITH LABYRINTH SEALS AND HUB/BACK IRON SPACERS

This is a continuation of copending application Ser. No. 07/926,478 filed Aug. 28, 1992, now abandoned which is a divisional of application Ser. No. 07/560,747 filed Jul. 31, 1990.

BACKGROUND OF THE INVENTION

The present invention relates to apparatus for reading, writing and storing bit-encoded data, and more particularly to disk drives including packs of multiple, concentrically stacked disks.

The continuing effort to increase data storage capacities of magnetic disk drives and other data storage devices is concerned largely with increasing the density at which data can be stored on the available recording surface area. Another approach involves mounting multiple magnetic disks on a single spindle assembly in which the disks are stacked in integral, spaced apart and concentric relation. Such spindle assemblies typically include an elongate shaft, a hub fixed to the shaft and supporting the disks, and bearings and bushings at opposed ends of the shaft, to support the shaft, hub and disks for rotation relative to the disk drive housing. Also mounted movably with respect to the housing is an actuator, either of the rotary or linear type, for selectively positioning data transducing heads relative to the disks.

The design and manufacture of such drives involve disparate and often competing needs. The preferred high data storage densities require precision alignment of the disk pack and actuator, stability during rotation of the spindle assembly and resistance to thermal effects due to differing thermal expansion coefficients of materials employed in the drive. The housing must be strong, lightweight, resistant to vibration and provide an effective seal to prevent contamination of the housing interior, particularly in the region of the disks. At the same time, cost considerations stimulate efforts to reduce the number of parts and steps involved in assembling disk drives.

Among the many approaches for meeting these needs is a divided housing for magnetic disks disclosed in U.S. Pat. No. 4,899,237 (Tochiyama et al). The housing includes a shell which supports both a magnetic disk pack and a rotary actuator, and a cover that closes an opening in the shell. Holes that support bushings at opposite ends of the spindle shaft are drilled through opposite side walls of the shell in a single operation, 10 and thus are precision aligned. The rotary actuator has a shaft which is similarly mounted by precision aligned holes in the shell. This arrangement is said to enhance the mechanical rigidity of the disk pack and actuator mountings, and improve sealing.

U.S. Pat. No. 4,835,637 (Mach et al) discloses a disk file in which a disk stack sub-assembly is mounted within a housing. A shaft of the sub-assembly is mounted to the housing through upper and lower bearings and associated upper and lower bearing supports. The lower bearing support is movable axially with respect to the outer race of the lower bearing. A spring biases the lower bearing support axially upward relative to the lower bearing outer race. This arrangement enables reduction of the sub-assembly length to enable its insertion between opposed parallel walls of the disk file housing.

While the above approaches have met with limited success, there remains a need to provide a disk drive capable of storing data at relatively high densities, and at low cost.

Therefore, it is an object of the present invention to provide a disk drive housing which is strong, lightweight and resistant to vibration and thermal effects.

Another object is to provide a spindle assembly for a disk drive including means for mounting a spindle shaft for rotation relative to a disk drive housing, which means are particularly well suited to facilitate assembly into a unitary housing.

A further object of the invention is to provide, in a spindle assembly with an internal motor, an effective system for purging air in the region of disks, and seal against contamination of the region of the disks from particulates generated near the motor and bearings.

Yet another object of the invention is to provide a mounting interface for a spindle assembly and disk drive housing, in which a rotatable spindle shaft is precisely aligned as it is installed into the housing, without jigs or other extraneous alignment tooling.

SUMMARY OF THE INVENTION

To achieve these and other objects, there is provided in a data storage apparatus, an enclosure for supporting a data storage disk and spindle assembly for rotation of the disks inside of the enclosure. The enclosure includes a unitary, substantially rigid deck including first and second opposed support walls. An intermediate peripheral wall means cooperates with the support walls to define a substantially enclosed chamber within the deck, with one end of the deck open to allow insertion of a spindle assembly into the chamber. The spindle assembly includes an elongate spindle shaft and first and second bushing means rotatably mounted to opposite ends of the shaft. First and second precision bores are formed in the first and second support walls, respectively and are open to the chamber. Each precision bore conforms to an associated one of the first and second bushing means. This permits a tight nesting engagement of each of the bushing means into its associated bore, the nesting engagement fixing and aligning the rotational axis of the spindle shaft relative to the deck, while simultaneously securing the spindle shaft rotatably to the deck. Each of the support walls, in a region about its associated one of the first and second bores, is tapered gradually from a maximum thickness at the rim of the associated bore to a reduced thickness radially remote from the bore.

Preferably a unitary cover is releasably secured to the deck at the open end to enclose the chamber. Third and fourth precision bores can be provided in the first and second support walls, respectively, for precision aligning and supporting a rotary actuator shaft in parallel and spaced apart relation to the spindle shaft, inside the chamber.

To further strengthen the enclosure, reinforcing ribs can be formed along respective exterior surfaces of the support walls. Preferably the ribs are formed as two mutually perpendicular series of substantially equally spaced apart ribs, to form a "waffle" pattern of repeating squares. The ribs are readily formed in the deck and cover by known casting techniques, and form a lightweight housing resistant to torque and bending stresses. The tapered conical wall portions near the spindle bores attenuate vibrations introduced into the deck and cover, minimizing the influence of vibrations upon data reading and recording operations. The combination of the tapered conical walls in the spindle area, and the waffling technique, results in optimum mass, i.e. minimum weight for maximum strength. The lighter weight deck and cover are less subject to outside shock and vibration, since the shock mounts have limited deflections.

Another aspect of the present invention is a spindle assembly for supporting data storage disks for rotation about a spindle axis with respect to a disk drive housing. The assembly includes an elongate spindle shaft, and first and second bushing means at opposite end portions of the spindle shaft. Respective first and second bearing means secure the bushing means for rotation relative to the spindle shaft, each bushing means surrounding its respective bearing means.

The first and second bearing means are constructed of a steel, and the first and second bushing means are constructed of aluminum, which has a coefficient of thermal expansion greater than the thermal expansion coefficient of steel. Each of the bearing means is retained in a compression fit within its associated bushing means up to a predetermined maximum temperature.

Preferably the bearing assemblies and the bushing means are substantially symmetrical about the spindle axis of the shaft. Because the elastic modulus of aluminum is substantially less than that of steel (approximately one-third), the increase in compression about the bearing at lower temperatures tends to cause elastic expansion of the aluminum bushing means rather than elastic contraction of the bearing. Conversely, at higher operating temperatures, the compression fit is retained, although reduced due to the relatively greater expansion of aluminum (as compared to steel) responsive to the temperature increase. A further advantage of the assembly is that one of the bearing means is mounted to slide axially with respect to the spindle shaft. Axial movement of the selected bearing means and its associated bushing means enables an axial retraction of the spindle for convenient assembly into a unitary deck or other housing structure. This feature also provides axial adjustment, to eliminate what otherwise would be excessively strict tolerances between the mating parts.

A further improvement in the spindle assembly involves means for restricting the radial passage of air between the first bushing means and a hub secured to the spindle, and between the second bushing means and the hub. The restricting means includes a first annular flange extended axially from either the first bushing means or the hub, into an annular groove provided in the other of the first bushing means and hub. A similar flange and surrounding groove are provided at the interface of the second bushing means and hub. In connection with the bushing means that is movable axially relative to the hub, the groove and flange are provided in sufficient length to maintain the flange within its associated groove, even with the axially movable bushing means extended. The restricting means further include portions of the first and second bushing means that extend radially inward along their associated bearing means to define a gap between each bushing means and its associated bearing means. Each gap is open in the radially inward direction to the spindle shaft, and closed in the radially outward direction to form a trap for airborne particulates.

For further improving disk drive performance, the spindle hub can be formed with alternating elongate, axially extended projections and flutes, with the projections supporting disks and intermediate annular spacers.

The flutes, in combination with notches or other openings formed in the spacers and coincident with the flutes, provide passages for air radially outward between adjacent disks which, in combination with appropriate filtering means, purges the air in the region of the disks.

Yet another aspect of the present the invention is the aforementioned deck in combination with a spindle having an elongate spindle shaft, first and second bushing means mounted rotatably at opposite end portions of the spindle shaft and conforming in their profile to the respective precision bores. At least one of the bushing means is slidable axially on the spindle shaft between a recessed position to permit insertion of the spindle assembly into the chamber, and an extended position wherein the first and second bushing means are respectively inserted into the first and second bores. A hub secures at least one data storage disk for rotation with the spindle shaft. First and second fastening means respectively urge the first and second bushing means axially away from one another and into a press fit engagement in the first and second bores, to integrally secure the bushing means to the deck while aligning the shaft, hub and disk for rotation relative to the deck and bushing means.

Preferably each of the bushing means includes a substantially flat and axially outward facing shoulder, and an alignment projection extended axially beyond the shoulder. Each alignment projection is inserted within its associated bore, with the shoulder abutting the associated support wall surface at the region about the bore. Each of the alignment sections projects axially outward of its associated shoulder by a distance of less than 0.04 inches. This minimal axial distance, preferably 0.02 inches, adequately retains the projection within its associated bore in a compression fit, yet minimizes undesirable scoring or galling, a particularly useful feature in connection with bushings and deck walls constructed of aluminum. The short projections further minimize the potential for harm due to an initial non-perpendicular insertion of the bushings into the precision bores.

Thus, in accordance with the present invention a variety of novel features are combined to substantially improve the performance of a magnetic disk drive in terms of rigidity, resistance to vibration, resistance to thermal effects and effective sealing against and purging of aerosols, particles and other contamination. The unitary deck and precision bores, in combination with the axially retractable spindle assembly, facilitate manufacturing in that alignment and assembly of the spindle shaft into the deck are accomplished simultaneously, and without jigs or other extraneous alignment apparatus.

IN THE DRAWINGS

For a further appreciation of the above and other features and advantages, reference is made to the following detailed description and to drawings, in which:

FIG. 5 is a perspective view of a connector employed with the spindle assembly;

FIG. 7 is a sectional view of the spindle assembly taken along the line 3—3 in FIG. 1;

FIG. 8 is an enlarged partial view of the top of the spindle assembly;

FIG. 9 is an enlarged partial sectional view of the bottom of the spindle assembly;

DETAILED DESCRIPTION OF THE PREFERRED EMBODIMENT

Figure 1:
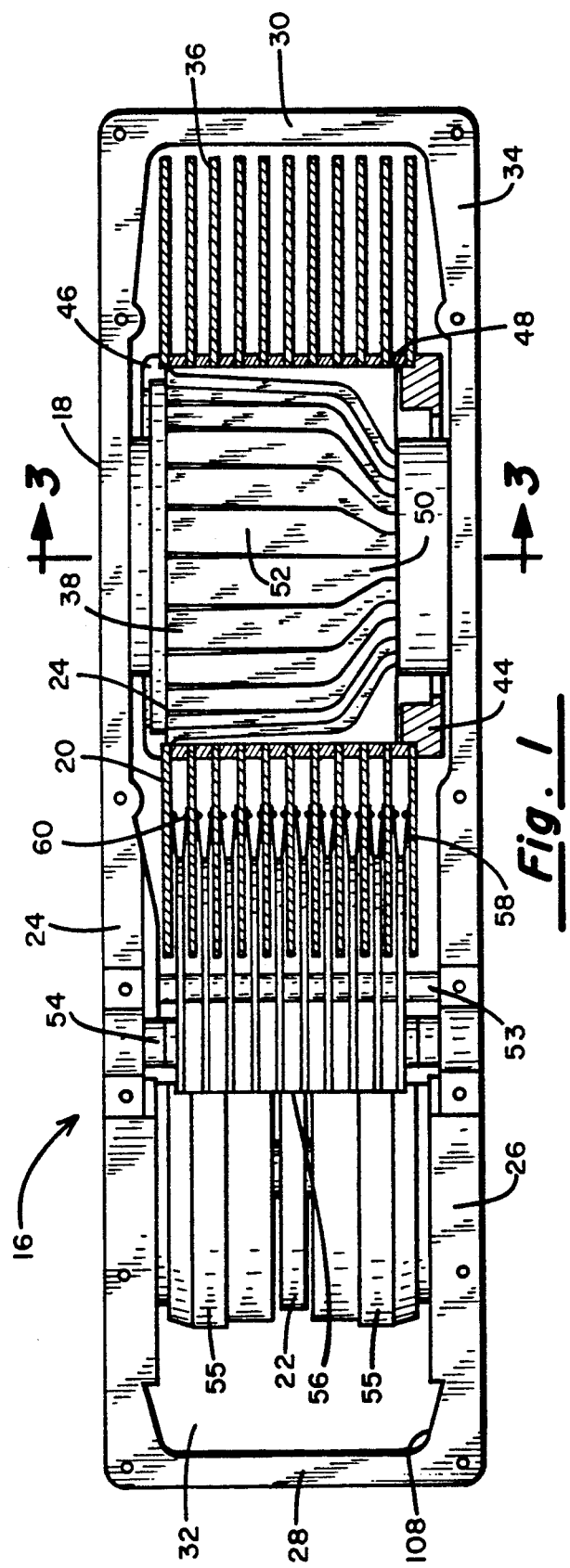
FIG. 1 is an end view of a magnetic disk drive constructed in accordance with the present invention, with a cover of the drive housing removed to expose a spindle assembly and rotary actuator mounted within a deck.

Turning now to the drawings, there is shown in FIG. 1 a magnetic disk drive 16 including a deck 18 forming part of the housing of the drive. A cover is removed from the deck in this figure, to reveal a disk pack 20 and a rotary actuator 22, both of which are mounted movably with respect to the deck.

The deck is unitary and preferably constructed of aluminum, and includes substantially parallel and spaced apart upper and lower support walls 24 and 26 which support the disk pack and rotary actuator. The deck further includes opposite side walls 28 and 30, and a rearward wall 32, which maintain the spaced apart relation of support walls 24 and 26. Forward edges of the support walls and side walls form a substantially planar forward edge surface 34, which mates with a conforming edge surface of the cover when the cover and deck are joined to form the housing.

Disk pack 20 includes a plurality of disks 36 mounted in coaxial and spaced apart relation to one another on a spindle assembly 38. The spindle assembly includes an upright spindle shaft 40 (FIG. 7) rotatable on a spindle axis, a hub 42 fixed to the shaft, and a clamping ring 44 releasably secured to the bottom of the hub. Clamping ring 44, in cooperation with a flange 46 at the top of the hub, clamps disks 36 and a series of annular spacers 48 in an alternating sequence to set the axial spacing between adjacent disks. Fasteners secure the clamp to the hub, so that the clamp and flange frictionally maintain the disks and spacers integrally with the hub for rotation with shaft 40 about the spindle axis.

In front of hub 42, portions of the disks and spacers in FIG. 1 are removed to reveal the contour of the hub surface, more particularly a series of alternating projections 50 and flutes 52 arranged substantially symmetrically about the hub. Projections 50 extend radially outward and have rounded radially outward surfaces that directly engage the disks and spacers, and thus cooperate to support the disks and spacers. Flutes 52 are recessed radially as compared to the projections, and provide conduits for air to create a purging air flow as is later explained. A vertical post or column 53 is secured to upper support wall 24 and lower support wall 26 by screws or other suitable fasteners. Column 53 is positioned radially outwardly of disks 36, and beyond the range of arcuate travel of rotary actuator 22, as illustrated in broken lines in FIG. 4. Column 53 rigidifies deck 22, reduces elastic deformation of the deck in response to the powerful actuator magnet (shown at 55), and raises the natural frequency of the deck for reduced vibration amplitudes.

Rotary actuator 22 includes an actuator shaft 54 mounted to rotate relative to the deck about a rotary shaft axis. Fixed to the shaft for rotation along with the shaft is an actuator body 56 and a plurality of head/arm assemblies 58, each including a magnetic data transducing head 60. In a well known manner, rotary actuator 22 is rotatable to selectively position heads 60 with respect to disks 36 for selective reading and recording of data on the disks.

Figure 2:
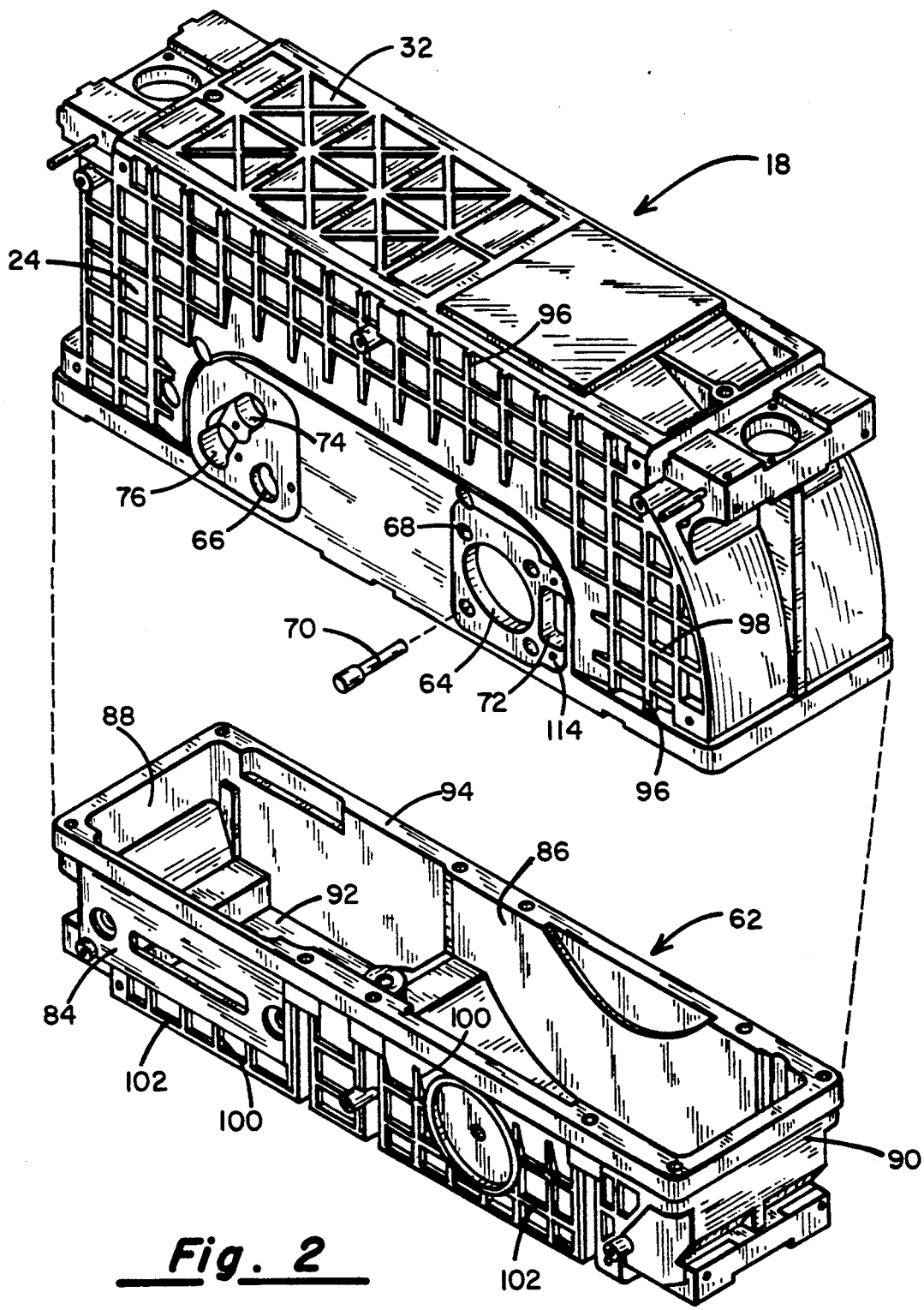
FIG. 2 is perspective view of the drive housing including the deck and cover.

Deck 18 is shown in greater detail in FIG. 2, along with a cover 62 that connects with the deck to provide the disk drive housing. Formed through upper support wall 24 are a precision bore 64 for accommodating the spindle assembly, and a 15 second precision bore 66 to accommodate a shaft of rotary actuator 22. Four openings at 68 near precision bore 64 accommodate fasteners 70 (e.g. socket head screws) used in securing spindle assembly 38 to deck 18. Between two of openings 68 is a rectangular slot 72, which accommodates a rigid electrical connector used in connection with a motor that drives the spindle assembly. A pair of openings 74 and 76 near precision bore 66 accommodate L-shaped actuator stops (not shown), that limit the angular travel of the actuator shaft.

Figure 4:
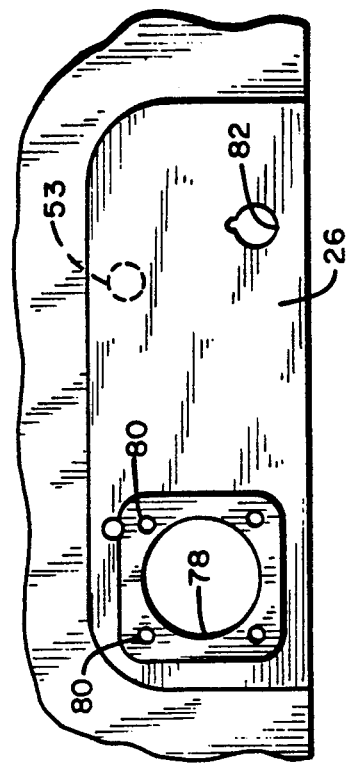
FIG. 4 is a partial view of the bottom of the deck.

As seen in FIG. 4, a precision bore 78 is formed through lower support wall 26, concentrically aligned with precision bore 64. Four openings 80 about bore 78 accommodate fasteners that secure the spindle assembly. A precision bore 82 also was formed through the lower support wall, concentric with bore 66 to accommodate the rotary actuator shaft.

Cover 62 includes parallel and opposed upper and lower walls 84 and 86 joined to opposed side walls 88 and 90 and a forward wall 92, together forming a unitary cover, like the deck preferably of aluminum. Side walls 88 and 90 and upper and lower walls 84 and 86 have rearward edges that cooperate to form an edge surface 94 conforming to edge surface 34 of the deck. While not illustrated, a recessed gasket generally conforming to edge surfaces 34 and 94 is maintained between the edge surfaces when the deck and cover are joined, to provide a fluid seal.

Two series of mutually perpendicular ribs on the deck, indicated respectively at 96 and 98, are formed along the exterior of upper support wall 24. Similar ribs are formed on the exterior of lower support wall 26. Likewise, cover 62 is provided with series of perpendicular ribs at 100 and 102, with similar ribs on the exterior of lower wall 86. These ribs resist bending and torsional stresses applied to the deck and cover, to rigidify the disk housing, while permitting a preferred lightweight construction which reduces material cost.

Figure 3:
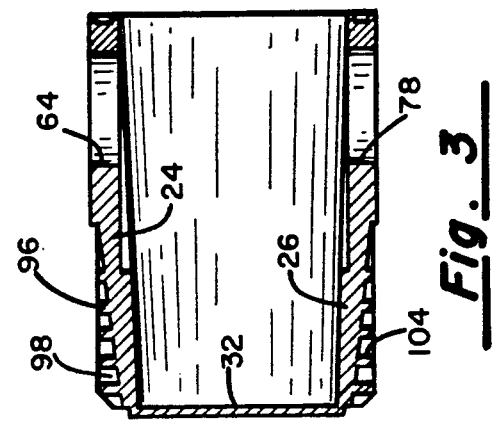
FIG. 3 is a sectional view of the deck taken along the line 3—3 in FIG. 1 and with the spindle assembly removed.

As seen in FIG. 3, upper support wall 24 and lower support wall 26 are tapered, varying from a maximum thickness near bores 64 and 78, respectively, to minimum thickness radially remote from the bores. As seen in connection with rib 96 and a corresponding rib 104 of the bottom support surface, the height of the ribs diminishes in correspondence to the increasing thickness of the adjacent support wall. The purpose of this arrangement is two-fold. First, the maximum thickness provides strength where it is required most, i.e. proximate the upper and lower spindle assembly mounting interfaces. Secondly, the tapered walls, as opposed to similarly constructed walls of uniform thickness, more effectively attenuate vibration and shock, whereby disk drive 16 is substantially less subject to damage or impaired performance due to vibrations.

FIG. 5 shows a rigid electrical connector 106, which is inserted into housing chamber 108 through slot 72 such that pins 110 extend into a corresponding socket of the spindle assembly. Openings 112 at opposite ends of the connector accommodate fasteners turned into openings 114 in the deck upper support wall. As compared to the flexible connector previously employed between the spindle assembly and the outside of deck 18, connector 106 is less subject to damage for lack of careful handling, to improve reliability as well as reduce manufacturing cost by reducing the time necessary to form the electrical connections. The possibility of damage to the disks from a dangling cable, during assembly or otherwise, is eliminated.

Figure 6:
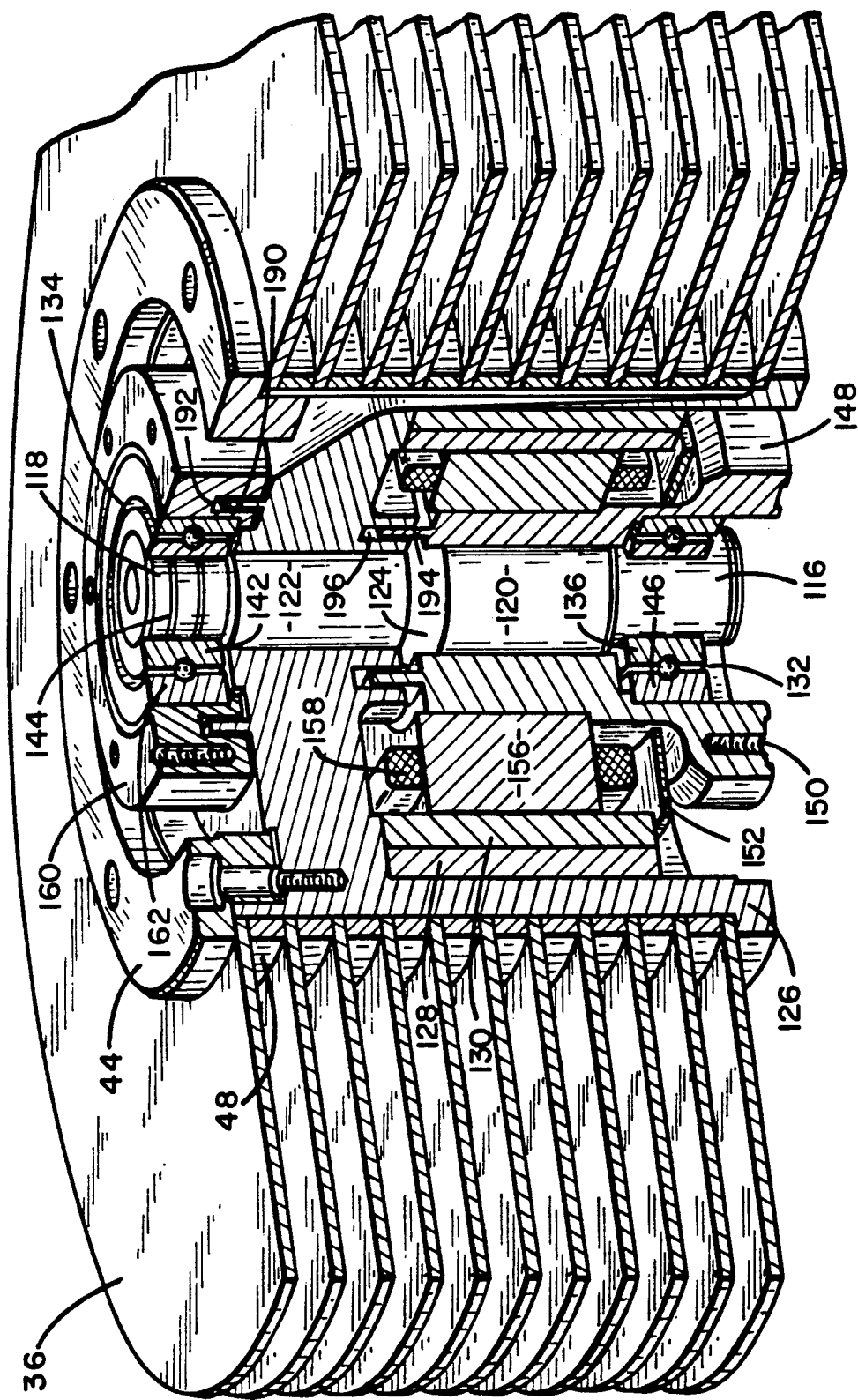
FIG. 6 is a perspective view of the spindle assembly, inverted to show certain features at the bottom of the assembly.

Spindle assembly 38 is shown in greater detail in FIG. 6 (and inverted in this figure to emphasize certain features at the bottom of the spindle assembly) and FIG. 7. Spindle shaft 40 is not uniform in diameter, but rather is stepped, including upper and lower end portions 116 and 118, and upper and lower intermediate shanks 120 and 122. Hub 42 is fixed to and surrounds lower shank 122, and abuts a shoulder 124 of shank 120, which determines the axial position of the hub on the shaft. Hub 42 is aluminum, and formed generally in the shape of a cup, with a radially outward wall 126 extended axially upwardly of the remainder of the hub. Hub wall 126 defines a cylindrical cavity containing an annular back iron 128 of steel, and an annular magnet 130 adjacent and surrounded by the back iron, both being secured integrally to hub 42 to rotate with the hub about the spindle axis.

Shaft 40 is supported rotatably by steel ball bearings, including an upper bearing 132 and a lower bearing 134 surrounding upper and lower shaft portions 116 and 118, respectively. An inner race 136 of the upper bearing is mounted slidably along upper shaft portion 116, and biased downwardly as viewed in FIG. 8 by an annular spring 138 between bearing 132 and a snap ring 140 on the upper end of the spindle shaft. An inner race 142 of lower bearing 134 is fixed to the spindle shaft at lower portion 118 using an adhesive and a press fit. Grooves 144 formed concentrically about the shaft enhance the adhesion of the bearing inner race.

The outer races of the bearings are contained within respective bushings in the form of sleeves. More particularly, an outer race 146 of upper bearing 132 is surrounded by an upper sleeve 148, a narrowed portion of which surrounds upper shank 120 of the spindle shaft. Sleeve 148 is secured to outer race 146, but spaced apart a slight distance from the upper shank to permit rotation of spindle shaft 40 relative to sleeve 148. One of four openings that extend axially into sleeve 148 is shown at 150. Openings 150 accommodate fasteners 70 through openings 68 in the upper support wall, to secure sleeve 148 integrally with deck 18. An annular printed circuit 152 is supported on sleeve 148, and a socket 154 integral with the printed circuit receives pins 110 of connector 106 for electrically connecting the spindle assembly with the environment outside of deck 18.

A stator, including core laminations 156 and windings 158, surrounds and is fixed to upper sleeve 148. A narrow radial gap between laminations 156 and magnet 130 provides clearance for rotation of the magnet and hub relative to the stationary stator.

A lower sleeve 160 is fixed to an outer race 162 of bearing 134 and surrounds the bearing. Fasteners through openings 80 in lower support wall 26 are received into lower sleeve 160, thus to secure the lower sleeve integrally to the lower support wall.

An upper portion of the spindle assembly is enlarged in FIG. 8 to more clearly show that upper sleeve 148 includes a relatively flat radially outward shoulder 164, and a cylindrical projection 166 axially outwardly of the shoulder, and conforming in transverse (radial) profile to precision bore for a nesting, press fit engagement into the bore 64. Projection 166 extends axially away from shoulder 164 by a preferred distance of about twenty thousandths of an inch, although having a length somewhat greater than 0.020 inches. Likewise, it is seen in FIG. 9 that lower sleeve 160 includes a shoulder 170 and a projection 172, extending in the axially outward direction from the shoulder a distance of at least 0.020 inches. Projection 172 conforms to the shape of precision bore 78, again to afford a precise nesting or press fit engagement of the projection into the bore.

Figure 10:
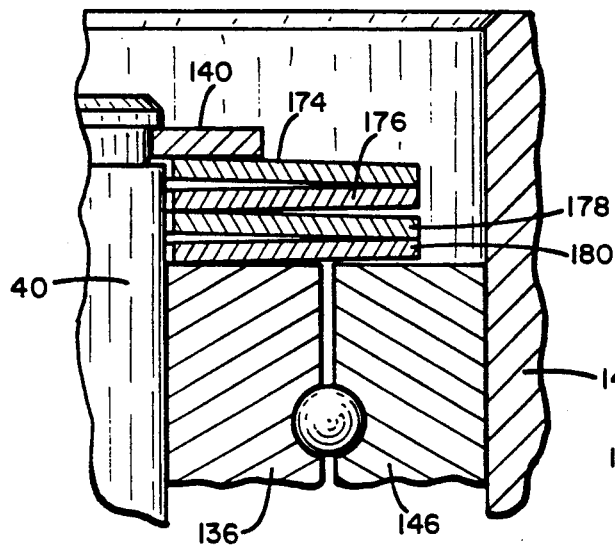
FIG. 10 is a further enlarged partial view of the top of the spindle assembly.

As previously noted, upper bearing 132 is mounted slidably on upper portion 116 of the spindle shaft. As seen in FIG. 10, spring 138 is formed of four spring or Belville washers 174, 176, 178 and 180 with a radially inward end portion of washer 174 abutting snap ring 140, and a radially inward portion of washer 180 abutting the inner race of bearing 132. Thus, spring 138 biases bearing 132 and sleeve 148 downwardly as viewed in FIGS. 8 and 10. In biasing bearing 132 particularly at inner race 136, spring 138 applies a preload to the bearing. This of course depends upon inner race 136 being slidable on shaft 40, while outer race 146 is fixed to sleeve 148. There is a further advantage of this arrangement, however, as compared to fixing the inner race to the shaft and mounting the sleeve to slide along the outer race. In particular, the exterior of spindle 40, as compared to the inside surface of sleeve 148, can be machined to substantially greater precision in achieving a cylindrical or round surface. Likewise, the inner surface of inner race 136 can be finished with greater precision than the outer surface of outer race 146. Thus the gap between shaft 40 and inner race 136, necessary to permit sliding, can be substantially narrower than would be an alternative gap between outer race 146 and sleeve 148, to substantially reduce spindle tilt.

Figure 11:
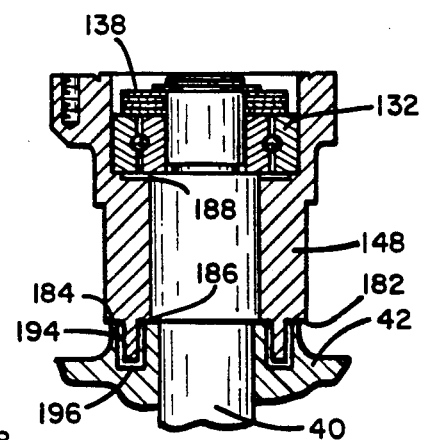
FIG. 11 is a view of the spindle assembly in the retracted position.

When spindle assembly 38 is free of deck 18, bearing 132 and sleeve 148 are moved downwardly by spring 138 until a bottom surface 182 of the sleeve abuts a radially inward annular surface 184 of hub 42, as shown in FIG. 11. Upper bearing 132, particularly inner race 136, is relatively close to shank 120 of the spindle shaft. In this retracted configuration, the distance between upper projection 166 and lower projection 172 (i.e. the axial length of the spindle assembly) is less than the vertical distance between the respective inside surfaces of upper and lower support walls 24 and 26. As a result, pre-assembled spindle assembly 38 is conveniently insertable into chamber 108 formed by deck 18, for preliminary positioning between and at least approximately concentrically aligned with bores 64 and 78.

With the spindle assembly retracted but inserted for attachment to the deck, fasteners 70, e.g. socket head screws, are tightened into sleeves 148 and 160 through openings 68 and 80, respectively. Tightening the fasteners draws the sleeves axially outward or apart from one another, each into its respective one of bores 64 and 78. As upper sleeve 148 is drawn into bore 64, it is urged upwardly relative to hub 42, and in turn urges bearing 132 upwardly along shaft upper portion 116, against the biasing force of spring 138. With this assembly technique, the bores are of course open to chamber 108, but need not extend completely through respective support walls 24 and 26.

Upon complete insertion of the sleeves into the bores, a gap 186 is formed between surfaces 182 and 184 as seen in Figure 7, and a gap 188 is formed between bearing inner race 136 and upper shank 120 as is best seen in FIG. 8. Further, upward movement of the bearing inner race compresses spring 138 between the inner race and snap ring 140, which provides a predetermined load upon bearing inner race 136. This effectively provides a predetermined load to both bearings 132 and 134, for a more stable rotation of the spindle shaft, hub and disks.

Rotary actuator 22 (FIG. 1) is mounted to the deck by inserting actuator shaft 54 into bores 66 and 82, then fixing the shaft onto V-blocks. Bores 66 and 82 in combination with the V-block construction precisely align shaft 54 in parallel, spaced apart relation to spindle shaft 40.

As perhaps best seen in FIG. 9, an annular flange 190 extends downwardly from hub 42 into a corresponding annular groove 192 formed in lower sleeve 160. Similarly, an annular flange 194 projects downwardly from upper sleeve 148 into an annular groove 196 formed in the hub (FIG. 6). In both cases, a slight clearance between the flange and groove facilitates rotation of hub 42 relative to the upper and lower sleeves. The juncture of each flange and groove forms a tortuous or convoluted path which inhibits and controls radially outward passage of air. The flanges within the grooves, and the narrow axial clearance between the hub and sleeves, temporarily direct radially traveling air into a substantially axial path, which tends to prevent aerosols, particulates and other foreign matter generated principally at bearings 132 and 134, from traveling outwardly into the region of disks 36.

Figure 12:
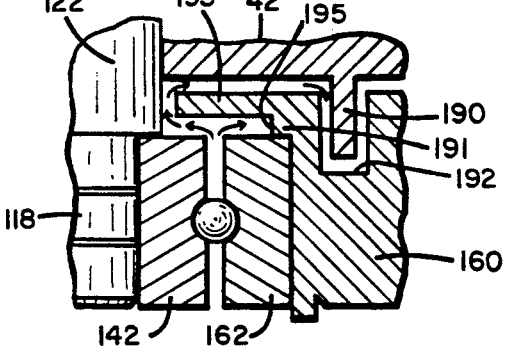
FIG. 12 is a further enlarged partial view of the bottom of the spindle assembly.

Further features cooperate with the respective flanges and grooves to provide respective labyrinth seals. More particularly, FIG. 12 shows a lip 193 formed as part of lower sleeve 160 and extended radially inwardly of the remainder of the sleeve, past the gap between inner race 142 and outer race 162, and terminating near lower shank 122 of the spindle shaft. Lip 193 is slightly spaced apart from hub 42, and bearing 134 by a ledge 191, to form respective horizontal gaps that accommodate rotation of hub 42, spindle 40 and inner race 142 relative to sleeve 160. The gaps allow passage of air, and any airborne particulates. However, due to centrifugal force effects during hub and spindle rotation, air and particles tend to flow radially outwardly along the lip and outer race, into a trap or pocket 195. The only alternative path for air and particulates is radially inward to the spindle, axially upwardly along the spindle, then radially outward and around flange 190.

Corresponding features at the upper end of the spindle assembly are best seen in FIG. 8. Sleeve 148 includes a ledge 197 that abuts outer race 146 whereby an inwardly extending portion 199 of the sleeve is separated from bearing 132 by a narrow, radial or horizontal gap. Portion 199 extends radially inwardly of the gap between outer race 146 and inner race 136. Again, the tendency of air leaving the gap between the races, when the spindle and hub rotate, is to flow radially outwardly, carrying any particulates into a trap near ledge 197. To flow beyond portion 199, air must travel radially inwardly, downwardly along a narrow (less than 0.003 inch) gap between sleeve 148 and spindle shaft 40, and then past flange 194.

Thus, upper and lower labyrinth seals protect against particulate contamination of disks 36. Both seals utilize axially extended annular flanges within annular grooves, and reduced vertical or axial clearance between the sleeves and their respective adjacent bearings, with the sleeve in each case extended inwardly of the gap between its respective inner and outer race. The upper labyrinth seal further involves a close spacing of upper sleeve 148 about the spindle upper shank.

A feature of the present invention is the mounting of bearings 132 and 134 within respective sleeves 148 and 160 in a manner which facilitates the preferred use of different metals, specifically steel in the bearings and aluminum in the sleeves. The bearings must be constructed of 52100 steel for strength, hardness and wear resistance. At the same time, aluminum is desired in the sleeves for its superior ability to conduct heat away from the spindle assembly, and for the press fit engagement into deck 18, also of aluminum, to avoid a thermal mismatch between the sleeves and deck. The thermal expansion coefficient of aluminum is greater than the thermal expansion coefficient of 52100 steel ($11.1$–$13.4 \times 10^{-6}$ per degree Fahrenheit, as compared to corresponding range of $6.4$–$7.0 \times 10^{-6}$ per degree F for 52100 steel). Accordingly, as disk drive 16 heats during operation, sleeves 148 and 160 expand more than their associated bearings. To counteract this effect, the sleeves are fastened in a compression fit about their respective bearings. Further, the relationship between the outer diameter of each bearing and the inner diameter of each its associated sleeve is such that the compression fit is retained to a selected maximum temperature substantially above temperatures expected under ordinary operating conditions.

At the same time, an unduly tight compression fit upon the bearings must be avoided. To this end, sleeves 148 and 160, in the regions near respective bearings 132 and 134, are sufficiently thin such that the strain due to compression fit forces is experienced principally by the sleeves. Further ensuring that the sleeves experience most of this strain is the fact that the elastic modulus of aluminum is approximately one-third that of steel ($9.9$–$11.4 \times 10^{-6}$ psi, as compared to approximately $28$–$30 \times 10^{-6}$ for steel).

Figure 13:
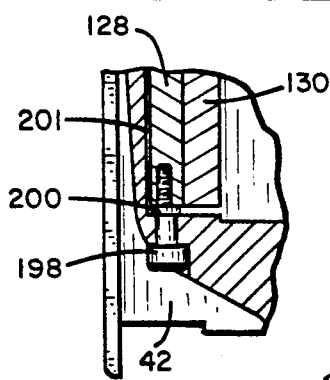
FIG. 13 is a partial view of a lower portion of the spindle assembly.

Another feature of spindle assembly 38 that counters thermal mismatch is the manner in which back iron 128 is mounted to hub 42, as seen in FIG. 13. A fastener 198, e.g. a socket head screw, is turned into back iron 128 through an opening in the hub. A spacer 200 separates back iron 128 and magnet 130 from hub 42. Three such pairs of fasteners and spacers, spaced axially apart from one another 120°, secure the back iron. Also, fasteners 198 position back iron 128 to form a radial gap 201 between the back iron and hub 42. This manner of mounting tends to isolate the back iron and aluminum hub from one another, against unwanted interaction due to thermal effects.

Figure 15:
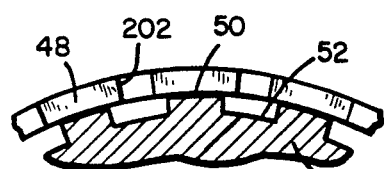
FIGS. 14–16 illustrate an annular spacer and an adjacent pair of disks of the spindle assembly.
Figure 14:
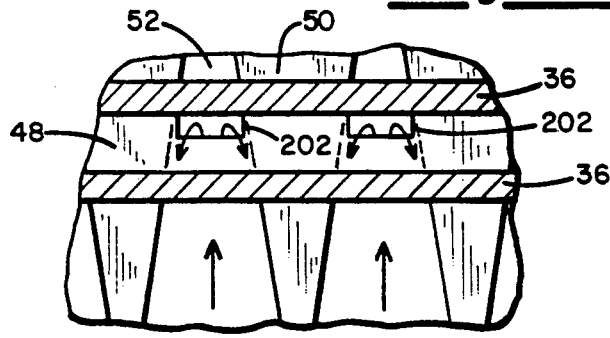
Figure 16:
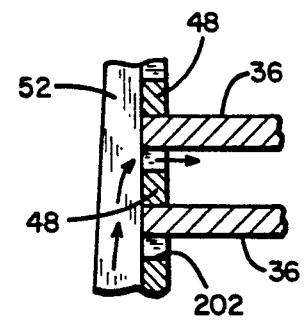

FIGS. 14–16 illustrate the manner in which annular spacers 48, in combination with flutes 52, provide a path for the flow of air during rotation of the disks and hub. More particularly, a series of notches 202 are formed in each of annular spacers 48, and the spacers are mounted on hub 42 to align the notches with flutes 52. Accordingly, as the rotating disks 36 tend to draw air radially outward, replacement air from flutes 52 flows radially outward into the space between each pair of adjacent disks.

As seen in FIG. 1, flutes 52 extend axially and are tapered, in that each flute progressively narrows in the axially upward direction. Adjacent projections 50 diverge upwardly. Further, a is best seen in FIG. 7, the depth of each flute decreases in the axially upward direction. Thus, the air flow capacity of each flute diminishes in the upward direction, which provides an air flow pattern in which air enters the flutes at the bottom of hub 42, and then proceeds upwardly in the flutes s well as radially outwardly between the disks, for convection cooling as well as purging. While this arrangement is preferred, it is within the scope of the invention to provide diminishing air flow capacity in the opposite direction for a downward and outward flow of air, or to provide flutes that converge toward the center of the hub, to receive air at both ends of the hub for subsequent radially outward flow intermediate the two ends.

Thus, in accordance with the present invention a disk drive is provided that is easier and less costly to assemble, yet is sturdy, lighter weight and reliable in its operation. The axially retractable spindle, in combination with precision bores in the deck, permits precise mounting of the spindle assembly directly into the deck, without the need for jigs or other extraneous tooling for proper alignment. The use of a continuous, unitary deck to support both the spindle shaft and the rotary actuator shaft ensures a precise alignment of the actuator and spindle assembly, and eliminates any effect of thermal mismatch or failure to precisely connect separate parts of the disk drive housing. Finally, the flow of purging air through the hub flutes, and the labyrinth seal protecting the disk region from the internal bearing and motor areas of the spindle, combine to significantly enhance long term operation of the drive.

What is claimed is:

1. A spindle assembly for supporting data storage disks for rotation relative to a fixed housing, including:
   an elongate spindle shaft having a spindle axis;
   a generally cup-shaped spindle hub having a first portion secured to the spindle shaft and an annular wall extended axially from the first portion for supporting at least one data storage disk for rotation about the spindle axis, said annular wall surrounding the spindle shaft and substantially concentric on the spindle axis;
   an annular back iron having an annular edge, and a plurality of fasteners extended through the first portion and into the back iron through the annular edge, for securing the back iron integrally with respect to the hub and substantially concentric on the spindle axis; and
   a plurality of spacers between the annular edge of the back iron and the hub, each spacer proximate an associated one of the fasteners, for maintaining the hub and annular edge of the back iron in axially spaced apart relation.

2. The spindle assembly of claim 1 wherein:
   Each of said spacers surrounds its associated fastener.

3. A spindle assembly for supporting data storage disks for rotation relative to a fixed housing, including:
   an elongate spindle shaft having a spindle axis;
   a generally cup-shaped spindle hub including a first portion secured to the spindle shaft and an annular wall extended axially from the first portion for supporting at least one data storage disk for rotation about the spindle axis, said annular wall surrounding the spindle shaft substantially centered on the spindle axis;
   an annular back iron having an annular edge, a plurality of fasteners extended axially through the first portion and into the back iron through the annular edge, for securing the back iron integrally with respect to the hub, and a spacing means between the hub and the annular edge, for maintaining the annular edge of the back iron in axially spaced apart relation to the first portion of the hub.

4. The spindle assembly of claim 3 wherein:
   said spacing means includes a plurality of spacers, one spacer surrounding each of the fasteners.

5. The spindle assembly of claim 4 wherein:
   said fasteners mount the annular back iron in spaced apart relation to the annular wall of the hub to define a radial gap between the hub and the back iron.

6. The spindle assembly of claim 5 further including:
   stationary first and second bushings, a first bearing means for mounting a first end of the spindle shaft to the first bushing for rotation of the spindle about the spindle axis, and a second bearing means for mounting a second and opposite end of the spindle shaft relative to the second bushing for rotation about the spindle axis, said spindle hub being integrally secured to the spindle shaft for rotation with the shaft.

7. A spindle assembly for supporting data storage disks for rotation relative to a fixed housing, including:
   an elongated spindle shaft rotatable on a spindle axis;
   a hub secured integrally to the spindle shaft and supporting at least one data storage disk for rotation with the spindle shaft;
   a stationary first bushing and a first bearing means for mounting a first end of the spindle shaft to rotate relative to the first bushing about the spindle axis, said first bearing means surrounding the spindle and being surrounded by the first bushing;
   a second stationary bushing and a second bearing means for mounting a second and opposite end of the spindle to rotate about the spindle axis relative to the second bushing, said second bearing means surrounding the spindle shaft and being surrounded by the second bushing;
   wherein the hub is disposed between the first and second bushings and defines a first radial gap between the hub and the first bushing, and a second radial gap between the hub and the second bushing, and wherein each of the bushings cooperates with its associated bearing means to prevent radially outward passage of air between the bushing and its associated bearing means;
   wherein the first bushing includes a first flow restriction means extending radially inward toward the spindle shaft and disposed between the first bearing means and the hub, said first restriction means terminating proximate the spindle shaft to define a first axial gap for accommodating passage of air between the first bearing means and the first radial gap; and
   wherein the second bushing includes a second flow restriction means extended radially inward between the second bearing and the hub, and terminating proximate the spindle shaft to define a second axial gap to accommodate passage of air between the second bearing means and the second radial gap.

8. The spindle assembly of claim 7 wherein:
each of the bearing means has an inner race surrounding the spindle shaft and an outer race surrounding the inner race, and each of the flow restriction means extends radially inward at least to the associated inner race.

9. The spindle assembly of claim 7 further including:
an annular first flange extended axially from one of the first bushing and the hub, toward the other of the first bushing and the hub, and an annular first channel in said other of the bushing means and hub, opposite the annular first flange and surrounding the annular first flange in non-contacting relation thereto; and
an annular second flange extended axially from one of the second bushing and the hub, toward the other of the second bushing and hub, and an annular second channel in said other of the second bushing and hub, opposite the annular second flange and surrounding the second flange in non-contacting relation thereto.

10. The spindle assembly of claim 9 wherein:
at least one of the first and second bushing is moveable axially relative to the hub and spindle shaft between proximate and remote positions with respect to the hub, and wherein the annular flange and the annular channel corresponding to the selected bushing means and hub each have an axial length sufficient for containment of the annular flange within the associated annular channel when the selected bushing means is in the remote position.

11. The spindle assembly of claim 9 further including:
an annular back iron concentric on the spindle axis, a plurality of fasteners for securing the back iron integrally with respect to the hub, and a plurality of spacers, one surrounding each of the fasteners, for maintaining the back iron axially spaced apart from the hub.

12. The spindle assembly of claim 11 wherein:
the hub is cup-shaped and has an annular radially outward wall concentric on the spindle axis, and the back iron is mounted to the hub in radially spaced apart relation to the annular radially outward wall.

13. The spindle assembly of claim 8 wherein:
the inner race of a selected one of the first and second bearing means is mounted to slide axially with respect to the spindle shaft, to enable axial movement of the selected bearing means and its associated bushing with respect to the spindle shaft and the hub.

14. The spindle assembly of claim 13 further including: a biasing means on the spindle shaft to urge the inner race of the selected bearing means in the axial direction toward the other bearing means.

* * * * *